United States Patent [19]

Haendel et al.

[11] Patent Number: 4,509,049
[45] Date of Patent: Apr. 2, 1985

[54] FMCW SYSTEM FOR PROVIDING SEARCH-WHILE-TRACK FUNCTIONS AND ALTITUDE RATE DETERMINATION

[75] Inventors: Richard S. Haendel, Iowa City; John C. Wauer, Cedar Rapids, both of Iowa

[73] Assignee: Rockwell International Corporation, El Segundo, Calif.

[21] Appl. No.: 401,801

[22] Filed: Jul. 26, 1982

[51] Int. Cl.³ .............................................. G01S 13/32
[52] U.S. Cl. ................................. 343/7.5; 343/12 A; 343/14
[58] Field of Search ................................. 343/7.5, 14

[56] References Cited

U.S. PATENT DOCUMENTS 2,928,085 3/1960 Katz ........................................ 343/14
4,146,890 3/1979 Klensch ............................. 343/14 X
4,367,473 1/1983 Marin et al. .......................... 343/14

Primary Examiner—T. H. Tubbesing
Attorney, Agent, or Firm—George A. Montanye; H. Fredrick Hamann

[57] ABSTRACT

An FMCW distance measuring system is disclosed which provides a search and track function for enabling searching for nearer returns during altitude tracking, and for more accurately determining altitude rate. A portion of the transmitted wave in an FMCW altimeter is mixed with the received signal indicating distance to target to produce a beat frequency between the transmitted wave and the received wave. The transmitted wave is triangularly modulated to produce separate upsweep and downsweep modulations which are maintained to produce a constant beat frequency from the return signal. The up and downsweep of the triangular modulation are independently operable so that tracking may be maintained on either or both of the sweeps or one sweep may track while the other sweep is searching for a nearer return. By comparing the difference in the modulation slopes during the up and downsweep, a reading can be provided which is indicative of the rate of change in altitude. The operation thus allows altitude searching during nearest return tracking along with a combined instantaneous reading of altitude rate without additional circuitry.

13 Claims, 6 Drawing Figures

Vd = SEARCH SLOPE
Vu = TRACK SLOPE

FMCW SYSTEM FOR PROVIDING SEARCH-WHILE-TRACK FUNCTIONS AND ALTITUDE RATE DETERMINATION

BACKGROUND OF THE INVENTION

The present invention relates to distance measuring apparatus and more particularly to FMCW altimeters and ranging systems.

As is well known, there are generally two types of distance measuring systems, one known as pulsed radar and the other as FMCW. In the pulsed radar technique, a series of RF pulses are transmitted towards the desired target and the receiver is operated to detect the return of the transmitted pulses that are reflected from the target. The time delay between the transmitted and received pulses is proportional to the distance to the target. By accurately controlling the transmission and detection of such pulses, highly accurate information can be obtained with respect to distance to the target.

In an FMCW distance measuring system, a continuous RF signal is repetitively swept by a frequency modulating signal and the resulting modulated carrier is transmitted towards a target. The FM signal is reflected by the target and returned toward the transmitter for reception. A portion of the transmitted signal is mixed with the reflected signal to produce a beat frequency indicative of the distance from the transmitter to the target. By controlling the modulation of the transmitted signal and by detecting the beat frequency, accurate readings of the distance to a target can be determined. Prior art FMCW systems are described in U.S. Pat. No. 4,107,679 and 4,276,549 and in the article entitled "Area Target Response of Triangularly Frequency-Modulated Continuous-Wave Radars, *I.E.E.E. Transactions on Aerospace and Electronic Systems,* Volume AES-14, No. 2, March 1978.

While each of the above techniques can give an indication of distance to a target, each technique has its own limitations. For example, the pulsed radar technique enables easy detection and tracking of the nearest return, thereby providing easy detection of altitude or height changes when used as an altimeter. The pulsed technique, however, requires high transmitter power and large receiver bandwidth and is normally confined to a specific frequency which enables easy jamming in a hostile environment. In addition, the high power solid state RF devices which are needed to generate the high power RF pulses are not as readily available as lower power devices. Further, at lower altitudes, it is difficult to generate and detect the pulses necessary to make accurate readings. In automatic landing systems, this becomes a problem since accuracy at low altitudes is essential for proper control.

In contrast, the FMCW technique enables distance measuring with a low power transmitter and narrow bandwidth receiver. Because the signal is continuously modulated or swept in frequency, it is less likely to be affected by jamming techniques. In addition, the cost and complexity is substantially reduced by the ready availability of low power solid state RF devices. By relying on the beat frequency produced by the mixing of the transmitted and received signal, however, the accuracy of the measurement is reduced. Specifically, the beat frequency produced by FMCW returns is not a single frequency but a spectrum of beat frequencies indicative of many reflections received from a target area and representing different altitudes from that target area. Conventional FMCW detection circuits produce readings which are the average of the spectrum of beat frequencies or the centroid of the spectral return of those beat frequencies rather than the nearest return. While this averaging is helpful in automatic landing systems, it does not provide high resolution for ground or terrain avoidance systems where pop-up targets are likely to occur and does not enable the system to respond quickly to rapid changes in altitude.

In particular, the inability of the system to identify pop-up targets during tracking and for reacquiring altitude tracking after rapid changes in terrain or altitude level increases the risk during flight situations. Since conventional FMCW altimeters rely on the average of a spectrum of beat frequencies, any measurement or response to a pop-up target will be severely inaccurate or delayed and any rapid change in altitude or terrain will necessitate lengthy time delays until the system adjusts the modulation slope sufficient to accommodate a new altitude. Conventional systems are, by design, inherently slow in responding to those changes in altitude and terrain. Also, while in such systems it is highly desirable to provide an indication of altitude rate (rate of change of altitude), the altitude rate is normally derived by differentiating altitude. This process is inherently noisy and requires smoothing circuits which necessarily introduce large lags in time response.

In the prior art, a variety of systems have been developed to improve the accuracy of the distance measuring provided by FMCW apparatus. These techniques attempted to improve frequency discrimination and modulation non-linearities in order to more accurately control the beat frequencies. Other techniques attempted to sweep over a range of beat frequencies and selectively filter frequencies in order to more accurately determine individual frequencies indicating nearest returns. Such attempts, however, have met with limited success since the filter characteristics and sweep time for altitude determination are prohibitive over the desired range of altitudes. As a result, the FMCW technique has been used primarily for automatic landing systems and low altitude measurements, while the pulsed technique has been used at high altitudes or where accurate target distance is required. The only other effective compromise has been to include both a pulsed radar and an FMCW radar to obtain the benefits of each during anticipated use.

As can be seen, if the accuracy of an FMCW radar can be improved to allow searching for nearer returns while tracking and to provide improved measurements of altitude rate, its use in more environments would be facilitated. The present invention has therefore been developed to improve that accuracy and to overcome the limitations of the above known and similar techniques.

SUMMARY OF THE INVENTION

In accordance with the present invention, an FMCW radar altimeter is disclosed which provides tracking, searching and a measurement of altitude rate. The system includes a modulated RF carrier signal transmitted towards a target area which in turn reflects the transmitted signal. A portion of the transmitted signal is mixed with the detected reflected signal to produce a beat frequency. The transmitted signal is modulated about a center frequency and maintained to have a modulation slope which produces a constant beat frequency.

A frequency discriminator detects the spectral return and tracks at a point in the return spectrum which represents the nearest return. An output provided from the frequency discriminator drives a modulation control servo which in turn causes the modulation slope to maintain the beat frequency at a constant value. The modulation of the output frequency is so controlled to produce a triangular waveform having an upsweep and a downsweep. Both sweeps are used to track the nearest return and adjust the modulation slope to maintain a constant beat frequency based on that nearest return. When aircraft altitude is changing, the difference in the signals produced on the upsweep from those produced on the downsweep indicates the rate of change in altitude as reflected by the Doppler effect. The upsweeps and downsweeps are independent of one another thereby allowing one to track while the other is searching for pop-up targets beyond the bandpass of the discriminator. In this manner, the altimeter may search for a lower altitude while tracking the current altitude.

It is therefore a feature of the present invention to provide a more accurate and versatile FMCW distance measuring system.

It is a further feature of the invention to provide an FMCW distance measuring system which accurately tracks altitude while searching for near returns indicating changes in altitude.

Still another feature of the invention is to provide an FMCW distance measuring system which provides a measurement and indication of the rate of change of altitude.

Yet another featue of the invention is to provide an FMCW radar altimeter which uses a triangularly modulated waveform having up and downsweeps both of which may independently search and track altitude.

A still further feature of the invention is to provide an FMCW distance measuring system having a triangularly modulated up and downsweep waveform to enable a detection of rate and change in altitude without complex circuitry.

These and other advantages and novel features of the invention will become apparent from the following detailed description when considered with the accompanying drawings wherein:

DETAILED DESCRIPTION OF A PREFERRED EMBODIMENT

Figure 1:
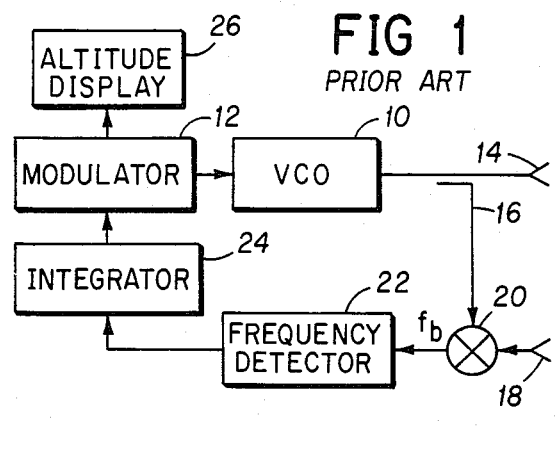
FIG. 1 is a schematic diagram showing an FMCW system known in the prior art.

Referring now to the drawings, wherein like numerals are used to refer to like elements throughout, FIG. 1 shows a typical FMCW distance measuring system as is commonly known in the prior art. The system generally includes a frequency generator 10 which is typically a voltage controlled oscillator (VCO) that provides a variable high frequency output about a center point frequency in response to a varying input voltage. The varying input voltage can be provided by a modulator 12 which is designed to linearly sweep the frequency transmitted by generator 10 about its center point. The modulator 12 may provide a ramp output voltage, the slope of which is controlled in a feedback loop as will be subsequently described. The output of the generator 10 is coupled to a transmitting antenna 14 which is positioned to beam the generated signal towards a target. In the present instance, the system will be described with respect to its use as an altimeter system in which the transmitter and the antenna are located in an aircraft above a ground target.

The transmitted high frequency from generator 10 is directed by antenna 14 to the ground or target area and a reflected signal is received by a second antenna 18 and coupled to a mixer 20. A portion of the output of generator 10 is coupled by coupler 16 (which may be a conventional directional coupler) as a second input to the mixer 20. The mixer 20 thereafter provides an output $f_b$ which is known as a difference signal or a beat frequency. In one prior art technique, the modulator 12 is operated to control the slope of the ramp voltage to maintain a constant beat frequency at the output of mixer 20. The beat frequency $f_b$ is coupled to a frequency detector 22 which is in turn coupled to an integrator 24 and thence to modulator 12. The output of frequency detector 22 is normally an error signal indicating the difference between the detected frequency $f_b$ and a desired beat frequency $F_b$. The integrator 24 receives this error signal and provides an integrated output to the modulator 12 which adjusts the slope of the waveform provided to VCO 10 so that the frequency detected by frequency detector 22 equals the desired beat frequency $F_b$. The altitude is then measured by the specific relationships established between the beat frequency, slope, and time period of the modulation waveform. Normally, the distance or altitude is proportional to the period of modulation when the amplitude of the modulating waveform is constant. Thus, an output from modulator 12 representing the period of modulation may be coupled to a display device 26 which calibrates and displays altitude in proportion to the period of modulation from modulator 12. Reference may be made to the previously mentioned U.S. Pat. Nos. 4,107,679 and 4,276,549 and to the I.E.E.E. Transactions article as examples of the above conventional and similar circuits.

In altimeters using the above known FMCW radar techniques, the frequency passband is limited due to the maintenance of the beat frequency $f_b$ at a constant value. However, in achieving this result, the altimeters are incapable of quickly responding to changes in altitude and indicating the presence of pop-up targets. When signals in a return spectrum are received from pop-up targets during the tracking of a given altitude, they normally fall outside the passband of the filter circuits contained in the systems of FIG. 1. Such systems are therefore incapable of meeting the stringent requirements of current aircraft in both military and commercial operations. In order to maintain the narrow bandwidth of the system, to make certain that the narrow bandwidth is detecting the nearest return, the system must go into a periodic search mode from low to high altitude to check the return signals. The search mode takes time and changes in altitude require an extended time for target acquisition which is unacceptable in most applications. Such techniques have therefore not been successful in improving the capabilities of the FMCW radar as an altimeter system.

Figure 2:
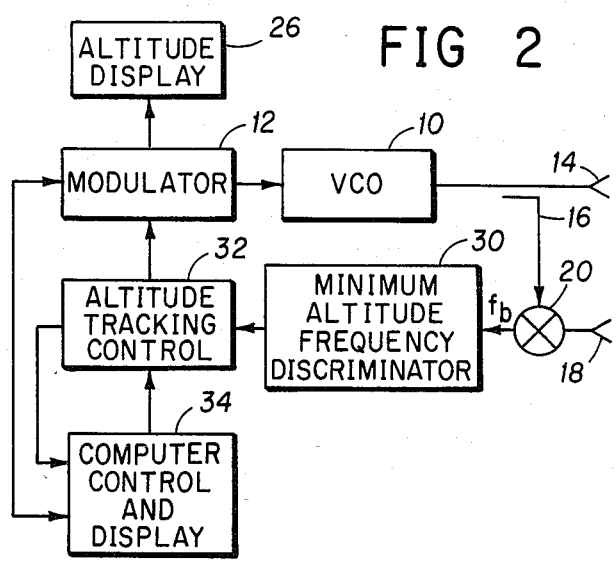
FIG. 2 is a schematic block diagram of an FMCW system employing the detection technique of the present invention.

In accordance with the present invention, the above disadvantages have been reduced by use of the system shown in FIG. 2. In this instance, the modulator 12 controls the frequency generator 10 to transmit high frequency signals from antenna 14 as was previously described in connection with FIG. 1. Again, the coupler 16 provides a portion of the transmitted signal to mixer 20 which also receives reflected signals constituting the returned signal spectrum through receiving antenna 18. The difference or beat frequency $f_b$ provided as output from the mixer 20 is then coupled to a minimum altitude discriminator 30 and thence to an altitude tracking control and modulation servo 32 under the control of a computer control and display 34.

The details of control 32 will be more particularly described with reference to FIG. 3. The minimum altitude discriminator 30, however, may be a frequency detector 22 as described with respect to FIG. 1, but is preferably a discriminator which is capable of providing a signal indicative of tracking on the nearest return such as that described in out copending application entitled "Nearest Return Tracking in an FMCW System", U.S. Ser. No. 401,804 assigned to the same assignee as this application, filed on even date herewith, and which is hereby incorporated by reference in its entirety.

As is known, the beat frequency produced by the mixer 20 is not a single frequency, but a return spectrum of different frequencies corresponding to difference distances to objects on the ground. Normally, the frequency detectors 22 are counters which count the average frequency of the return spectrum and compare that average frequency to a desired beat frequency $F_b$ to obtain an error signal rather than providing an output based on one specific frequency representing the nearest return. Control of the modulation slope and thus the modulation period of conventional altimeters is therefore dependent upon tracking of the average frequency rather than nearest return. As a result, the response of the altimeter is such that it tracks the centroid of the return spectrum as reflected by the average frequency which prevents nearest return detection or discrimination.

Naturally, a frequency detector which enables tracking of the nearest return will give improved altitude measurements and thus more accurate readings with respect to the terrain over which an aircraft is flying. In particular, tracking of the nearest return is necessary to enable the detection of pop-up targets which may only appear briefly and which in conventional FMCW systems will not have sufficient effect on the spectral return to change the altitude reading unless it appeared for a substantial amount of time. Use of the leading edge tracking discriminator in the above-referenced co-pending application is therefore more beneficial to the operation of the present system. It should be noted, however, that even with the use of prior art frequency detectors, the presently described technique will improve the altimeter performance and still enable the calculation of rate of change in altitude in a less complex manner.

Returning now to FIGS. 2 and 3, the altitude tracking and modulation servo control 32 receives input from the minimum altitude discriminator 30 and uses that signal to control the modulator 12 for providing slope changes in the modulation waveform and providing readings of altitude on the display 26. The altitude tracking and modulation servo 32 is under the control of a conventional computer as will be described in more detail with respect to FIG. 3.

Typically, in prior art systems, the modulation waveforms have been shaped in the configuration of a series of repetitive saw tooth waveforms as specifically shown in the previously-mentioned I.E.E.E. Transactions article and the two referenced patents. Each period of modulation is used to control the output frequency of the VCO so that the beat frequency stays at a constant value. In maintaining the constant value for the beat frequency, the passband of the system is narrow around the beat frequency $f_b$ and any signals falling substantially below the passband, which would normally represent nearer returns, are not seen or detected by the frequency detector 22. In addition, prior art systems often use passband filters which further limit the signals received by the frequency detector 22 and prevent the detector from viewing nearer returns during operation. As was previously noted, this necessitates a search of the entire altitude range, which results in a loss of tracking during that time period, thereby rendering the system less efficient.

Figure 4A:
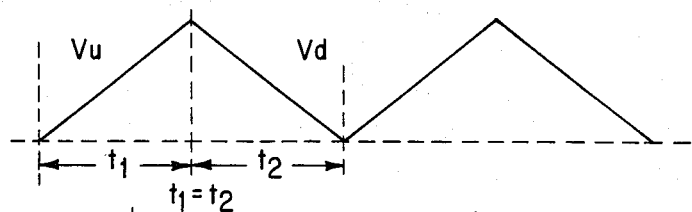
FIG. 4A–4C are waveform diagrams showing examples of the triangular waveform modulation as it appears during tracking, altitude rate determinations, and search-while-tracking.

In accordance with the present invention, a triangular waveform as more particularly shown in FIG. 4A is used as the modulation waveform from modulator 12 to control the output frequency from VCO 10. This triangular waveform, has both an upsweep Vu and a downsweep Vd, each of which are used to provide signals at the output of the discriminator 30. In this example, separate channels are used to detect output from 30 during the upsweep and downsweep to enable independent operation of each of the channels. In this way, one channel may be tracking returns representing a given altitude while the other channel may search for nearer returns created by pop-up target or rapid changes in the terrain. This enables tracking to be maintained in spite of terrain changes or pop-up targets thereby providing a more accurate profile of the terrain.

Figure 3:
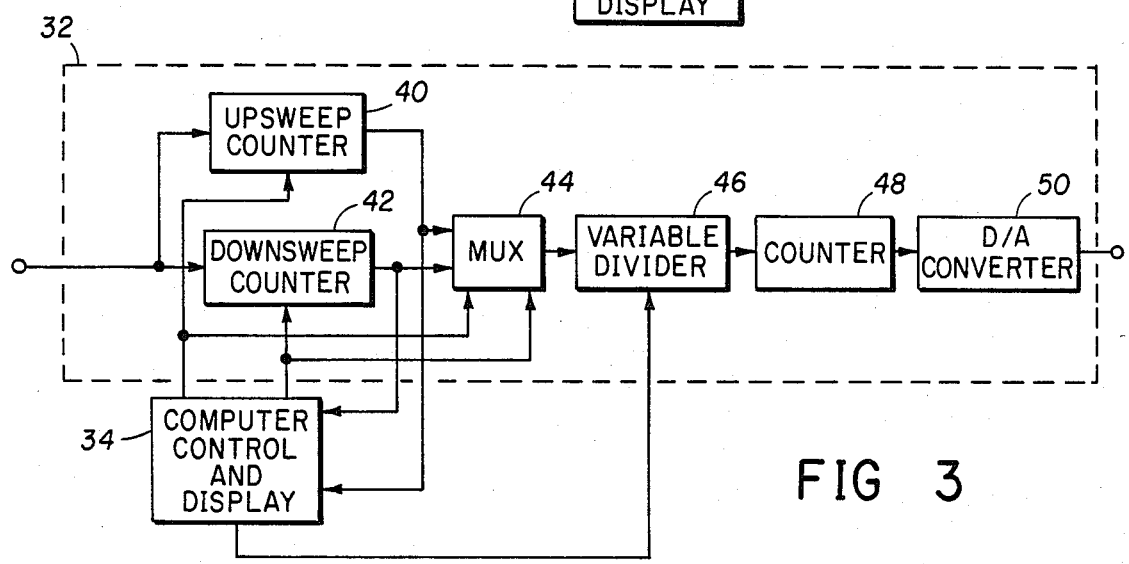
FIG. 3 is a schematic block diagram showing the details of the altitude tracking and modulation servo in the circuit of FIG. 2.

Referring more specifically to FIG. 3, the output from the minimum altitude discriminator 30 is coupled as input to counters 40 and 42 which are capable of counting both up and down. Counters 40 and 42 are conventional counters which respond to clock pulses (not shown) to increment or decrement their counts. Each counter increments its count by one for each clock cycle in which the output of the minimum altitude discriminator 30 is positive and decrements its count by one for each clock cycle in which the output of the minimum altitude discriminator 30 is negative. Each counter 40 and 42 is also specifically coupled to provide tracking during one of the upsweeps or downsweeps in the triangular waveform. In FIG. 3, the counter 40 is designated as the upsweep counter and counter 42 is designated as the downsweep counter although each is identical in construction. The operation of the counters is controlled by the computer control and display 34 to synchronize the operation of the upsweep counter for operation during the upsweep in the triangular waveform from the modulator 12 and to synchronize the operation of downsweep counter 42 for operation during the downsweep of the triangular waveform from modulator 12. A signal indicating the start of the upsweep and downsweep may be provided in a conventional manner to the computer control and display 34 from modulator 12 or the computer control 34 may be conventionally used to initiate up and downsweeps of the modulator 12. As previously stated, the counters are conventional digital counters which respond to the output of the discriminator 30 as described. Thus, each of the counters initially store a count proportional to the slope of the modulation and provide a specific count output when the error signal output of discriminator 30 is zero and indicates that the nearest return is being tracked and producing a constant beat frequency $f_b$. If the error signal is not zero during the upsweep or downsweep, indicating that the nearest return is not being tracked, the output from discriminator 30 will cause the numbers counted in counters 40 and 42 to be either more or less than that number normally present when the beat frequency is held constant and tracking the nearest return.

The outputs from the counters 40 and 42 are coupled to the computer control and display 34 for control of the counter clock and counter scale change and for calculating the rate of change in altitude as will be subsequently described. The outputs from counters 40 and 42 are also coupled through a multiplexer 44 under the control of computer control and display 34 which alternately selects one of the outputs from 40 or 42 for transmission to the output of the multiplexer. The computer makes the synchronization so that during the upsweep of the triangular waveform, counter 40 counts and multiplexer 44 provides the output of counter 40 and variable divider 46. Likewise during downsweep of the triangular waveform, the computer enables counter 42 to count and causes multiplexer 44 to provide its output from counter 42 to variable divider 46. The operation of the computer to control the synchronization of the upsweep and downsweep of the modulation waveform with the activation of the counters 40 and 42 and multiplexer 44 may be implemented with conventional programming and switching techniques and requires no further detailed explanation in order for an understanding off the present invention.

The output of the multiplexer 44 selected by the computer and control 34 is coupled to a variable divider 46 which provides a stream of clock pulses, the number of which depends inversely upon the input from upsweep counter 40 or downsweep counter 42. The clock rate to the divider 46 may be provided by the computer control 34 or any other conventional clock circuit designed to provide a data stream output in response to the count output from counter 40 or counter 42. The output of the variable divider is a stream of pulses whose rate is inversely proportional to altitude. This pulse stream is applied to a counter 48. Counter 48 increments its count by one for each pulse of the input stream when the pulse is derived from the upsweep counter 40 and decrements its count by one for each pulse of the input stream when the pulse is derived from the downsweep counter 42. Switching from upsweep to downsweep and vice versa is performed to yield exactly the same number of input pulses on an upsweep and a down sweep. The output of counter 48 is applied to a digital-to-analog converter 50. The output of the D/A converter 50 is a triangular wave whose positive and negative slopes are controlled independently and which is used as the control signal for modifying the slope of the modulator 12.

In operation, the minimum altitude discriminator 30 gives a binary positive and negative pulse output in accordance with the tracking of the nearest return. This output from 30 drives the upsweep/downsweep counters in the altitude tracking control and modulation servo 32, one during the positive modulation slope and one during the negative modulation slope. The counters 40 and 42 in turn control (through multiplexer 44) the variable divider 46 and counter 48 to produce a modulation upsweep and downsweep in modulator 12 with a modulation period which is inversely proportional to the altitude values in the counters 40 or 42. Altitude is then proportional to the average modulation slope and may be viewed by a conventional display 26 which measures the modulation period or slope.

The digital implementation described above has a significant advantage over other implementations in that the basic accuracy is not dependent on the calibration of analog devices such as a frequency discriminator. The accuracy of this device is only dependent on the accuracy of the digital clock which is derived from a crystal and is extremely accurate.

In its simplest form the upsweep and downsweep counters 40 and 42 must be large enough to hold the largest altitude to be tracked and with sufficient resolution for the smallest altitude to be tracked. This may require a very large register. The total altitude range may be broken up into several smaller altitude ranges each with a different altitude sensitivity. Altitude sensitivity may be controlled by changing the clock driving the divider 46 or by changing the total frequency deviation of the modulator 12. If the upsweep and downsweep counters 40 and 42 are rescaled at the same time that the altitude sensitivity is changed, the altimeter will not lose lock when changing range.

Figure 4B:
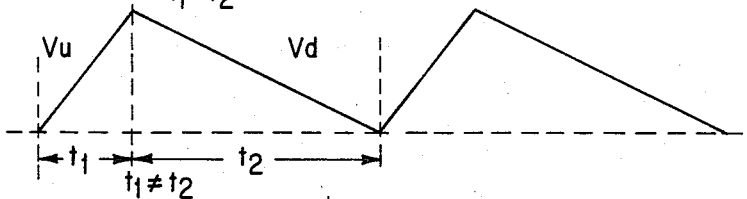
Figure 4C:
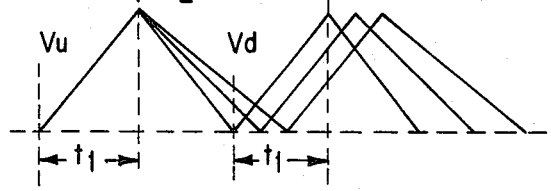

As will be readily apparent, use of the above technique enables independent tracking and search-while-tracking. Specifically, if the system is tracking an altitude on both the up and downsweeps, where the aircraft is flying at a level altitude, the upsweep and downsweep will be equal and both channels involving counters 40 and 42 will contain the same numeric values representing the same altitude (FIG. 4a). So long as the altitude remains constant, each channel will continue to track and provide an altitude reading. If, however, it is desired to search for pop-up targets or changes in altitude of the terrain, the computer and control display 34 may be programmed using conventional techniques to periodically change the number in one of the counters 40 or 42 so that the modulation slope produced by modulator 12 searches for targets from a low altitude to the present range (FIG. 4c). It does this by controlling the count in counter 40 or 42 to vary the slope of modulation produced. If a closer target is encountered representing a pop-up target, the beat frequency $f_b$ at the output of the altitude discriminator 30 on the selected sweep will indicate that that target has been detected and that sweep will lock onto the closer target. At that time, the computer can also be operated to adjust the number count in the counter controlling the other sweep so that it also locks onto the nearer return and tracks the nearer return during both upsweep and downsweep. Thus, due to the ability of both the upsweep and downsweep to track independently, a periodic search can be initiated on one sweep enabling detection of pop-up targets without loss of altitude tracking on the other sweep during that time period. This enables faster target acquisition and better overall response for changes in altitude in accordance with terrain variation.

In addition to the above search-and-track, the system enables a calculation of altitude rate based upon the slopes of the upsweep and downsweep during altitude tracking. By way of example, if the system is locked onto a constant altitude and tracking that altitude, the modulation slope will be equal on both the up and downsweep as shown in FIG. 4a. As long as the aircraft is maintaining a constant altitude with respect to the terrain, the upsweep and downsweep slopes will continue to be equal and the numbers contained in counters 40 and 42 will be the same. If, however, the aircraft begins to ascend or descend from that altitude, the Doppler shift will cause a shift in the return signal frequencies such that the upsweep modulation slope becomes different than the downsweep modulation slope as more specifically shown in FIG. 4b. The difference in slopes is a direct measure of rate of change in altitude. The numbers contained in counters 40 and 42 will now be different and the difference may be easily calculated and displayed by computer control and display 34. In this manner, an easy determination of altitude rate can be performed without additional complex and noisy determinations based on differentiation of altitude.

As can be seen from the above description, the present technique enables the altimeter to operate in one of two modes and in both modes simultaneously. In the search mode, the counters are computer controlled to produce numbers causing the upsweep or downsweep slope to vary over a given range until a nearest return is detected at which time the system will lock onto and track that nearest return and provide continouous altitude information. The nearest return is determined by the discriminator 30 which insures that the nearest returns are being tracked. If a return signal frequency appears significantly below the frequency signal being tracked so that it is below the passband of the system, that signal will not be detected by the minimum altitude discriminator in the track mode. Accordingly, a search can be periodically initiated in one channel simultaneous with the tracking in the other channel to verify that there are no reflected signals at an altitude lower than the tracking altitude. Search is initiated on one sweep (up or down) of the FMCW modulation waveform while track is maintained on the other sweep. Therefore, complete altitude information is not lost when searching for pop-up targets. Search may be alternately performed on two sides of the triangular waveform. The system can also be set to revert to the search mode when track is lost, thereby insuring that the system responds as quickly as possible to loss of tracking and miniminizing that time. Since the system can be made to automatically and periodically search for nearer returns during tracking, any such loss of track is minimized.

As a result of the above operation, the system enables more accurate and reliable tracking of altitude and an improved determination of altitute rate. The independent operation of the channels additionally provides improved safety since a loss of one channel will not prevent the operation of the other. All of these are advantages that are not taught or suggested by the prior art.

While the system has been described with reference to particular elements, it is obvious that other equivalent devices may be used. It should also be noted that various filters and other conventional elements as are known and used in the prior art may be necessary to provide appropriate signals for control in accordance with the described technique. These elements and their cooperation are apparent to one of ordinary skill in the art and their inclusion and cooperation would be apparent without further discussion.

Obviously, many other modifications and variations of the present invention are possible in light of the above teachings. It is therefore to be understood that within the scope of the appended claims, the invention may be practiced otherwise than as specifically described.

What is claimed is:

1. A distance measuring apparatus comprising:
   means for providing a modulating signal having an upsweep and a downsweep;
   means responsive to said modulating signal for generating a variable frequency signal;
   means for transmitting said variable frequency signal to a target;
   means for receiving a return spectrum of said variable frequency signal reflected from said target; and
   means response to said return spectrum for controlling said modulating signal for tracking distance to target independently on both said upsweep and said downsweep.

2. The apparatus as claim 1 further including means responsive to the slope of said upsweep an downsweep for providing an output representing distance to target.

3. The apparatus of claim 1 wherein said means for controlling comprises means for comparing the modulation slope on the upsweep with the modulation slope on the downsweep to provide an output representing rate of change in altitude.

4. A distance measuring apparatus comprising:
   means for providing a modulating signal having an upsweep and a downsweep;
   means responsive to said modulating signal for generating a variable frequency signal;
   means for transmitting said variable frequency signal to a target;
   means for receiving a return spectrum of said variable frequency signal reflected from said target; and
   means responsive to said return spectrum for controlling said modulating signal for tracking the distance to target independently on said upsweep and downsweep and including
   means for altering the modulating signal on one of said sweeps to search for a nearer distance to target.

5. The apparatus of claim 4 further including means responsive to said tracking sweep of said modulating signal for providing an output representing altitude.

6. A distance measuring apparatus comprising:
   means for providing a linear modulating signal having an upsweep and a downsweep;
   means responsive to said modulating signal for generating a variable frequency signal on both said upsweep and said downsweep;
   means for transmitting said variable frequency signal to a target;
   means for receiving a return spectrum of said variable frequency signal reflected from said target;
   means for mixing a portion of said transmitting variable frequency with said received reflected signal to produce a return spectrum of beat frequencies;
   means for detecting said beat frequency spectrum, comparing said beat frequency spectrum with a reference frequency and providing an output representing the difference between the two; and
   means responsive to said difference output for controlling said means for modulating independently on both said upsweep and said downsweep to produce a constant beat frequency equal to said reference frequency.

7. The apparatus of claim 6 wherein said means for controlling comprises means for comparing the modulation slope on the upsweep with the modulation slope on the downsweep to provide an output representing rate of change in distance.

8. The apparatus of claim 6 wherein said means for detecting comprises means for detecting a predetermined point within said beat frequency spectrum as the nearest return and compare that frequency with said reference frequency for providing an output representing said difference.

9. The apparatus of claim 6 wherein said means responsive to said difference output includes a first means for controlling the upsweep slope in response to said difference output and second means for controlling said downsweep slope in response to said difference output.

10. The apparatus of claim 9 wherein said first and second means include digital counters.

11. In an FMCW distance measuring system including a frequency generator for generating a variable frequency output in response to a modulating signal, a transmitter for transmitting said variable frequency to a target, a receiver receiving a reflected signal from said target, and a means coupled to mix transmitted and received energy to produce a beat frequency output, the improvement comprising:
 means producing said modulating signal having an upsweep and a downsweep; and
 means responsive to said beat frequency output for controlling said modulating signal independently on both said upsweep and said downsweep to maintain said beat frequency constant.

12. The apparatus of claim 11 wherein said means responsive to said beat frequency output comprises means responsive to a predetermined point within a beat frequency spectrum for maintaining a constant beat frequency representative of the nearest distance to target.

13. In an FMCW radar distance measuring system having a means for transmitting a variable frequency signal to a target and a means for receiving and forming a frequency spectrum relating to the range of the target, the improvement comprising:
 means for providing a linear modulating signal having an upsweep and downsweep for producing said variable frequency signal; and
 means responsive to said frequency spectrum for controlling the slope of said linear modulating signal independently on said upsweep and downsweep to track a point in said frequency spectrum representing the nearest distance to said target.

* * * * *